United States Patent [19]

Klose et al.

[11] Patent Number: 5,120,390

[45] Date of Patent: Jun. 9, 1992

[54] TIRE CARCASS BUILDING DRUM WITH INFLATABLE BLADDERS

[75] Inventors: Karl W. Klose; Devon D. Lease, both of Findlay, Ohio

[73] Assignee: Copper Tire & Rubber Company, Findlay, Ohio

[21] Appl. No.: 528,992

[22] Filed: May 25, 1990

[51] Int. Cl.5 .............................................. B29D 30/26
[52] U.S. Cl. .................................... 156/401; 156/398; 156/414
[58] Field of Search ................. 156/110.1, 132, 131, 156/396, 406, 406.4, 421.2, 421.8, 415, 401, 398, 400, 414

[56] References Cited

U.S. PATENT DOCUMENTS

| | | | |
|---|---|---|---|
| 3,418,792 | 12/1968 | Nädler | 156/401 |
| 4,314,864 | 2/1982 | Loeffler et al. | 156/111 |
| 4,402,782 | 9/1983 | Klose et al. | 156/414 |
| 4,469,546 | 9/1984 | Klose | 156/406 |
| 4,584,038 | 4/1986 | Enders | 156/133 |
| 4,820,373 | 4/1989 | Klose | 156/405.1 |
| 4,830,693 | 5/1989 | Okafuji et al. | 156/132 |
| 4,836,880 | 6/1989 | Haas | 156/400 |

*Primary Examiner*—John J. Gallagher
*Assistant Examiner*—Francis J. Lorin
*Attorney, Agent, or Firm*—Joseph G. Nauman

[57] ABSTRACT

A tire carcass building drum is provided adjacent its ends with a shoe movable axially thereto which comprises a main shoe and a secondary shoe rotatably mounted by bearings on the main shoe. The secondary shoe is provided with turn-up bladders thereon, which bladders function to turn over extended ply ends around bead assemblies placed on other components of a tire carcass being assembly on the drum. The secondary shoe further includes a toe surface engageable with the ends of the drum to thereby render the bladder members rotatable with the drum surface. These bladders also provide a support for ply ends against which the consolidating and stitching rollers can act to smooth and press together the ply materials.

3 Claims, 11 Drawing Sheets

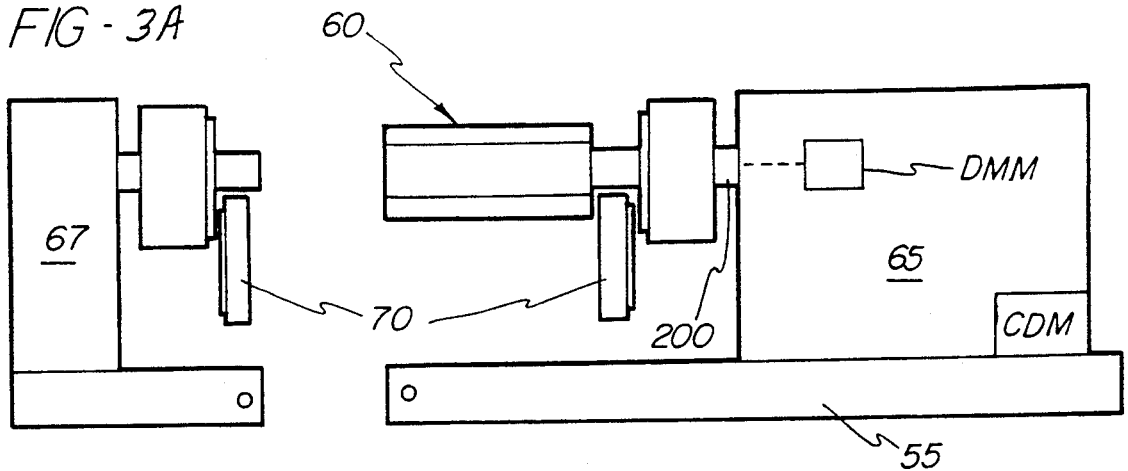
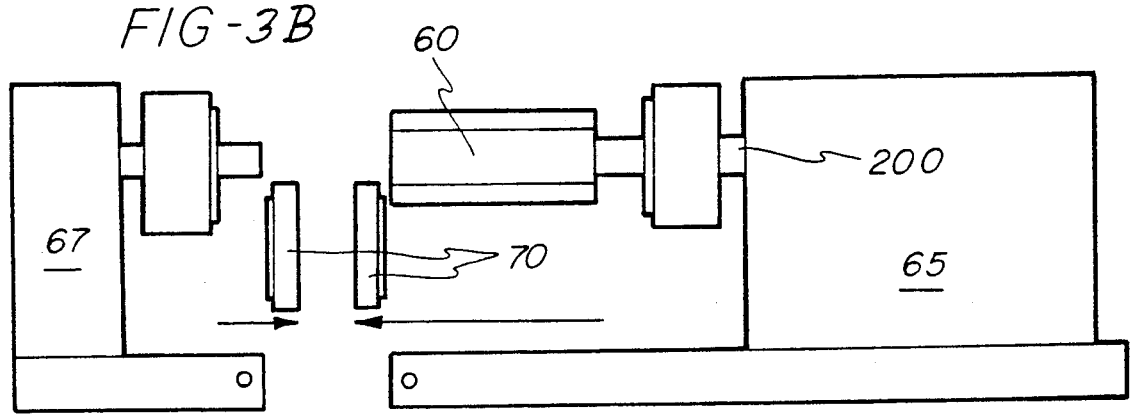
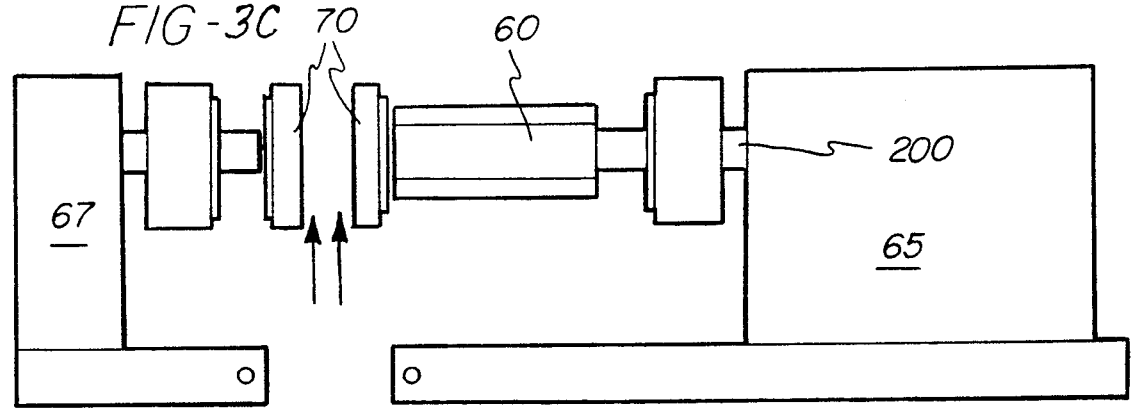
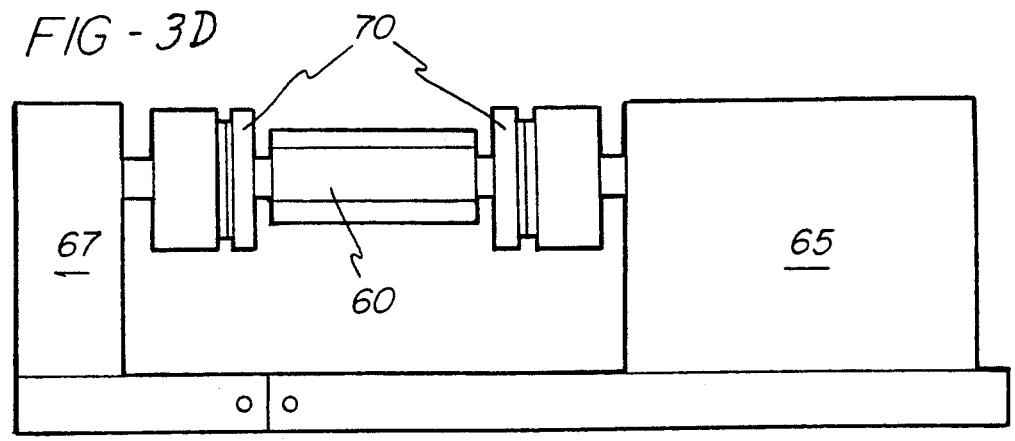

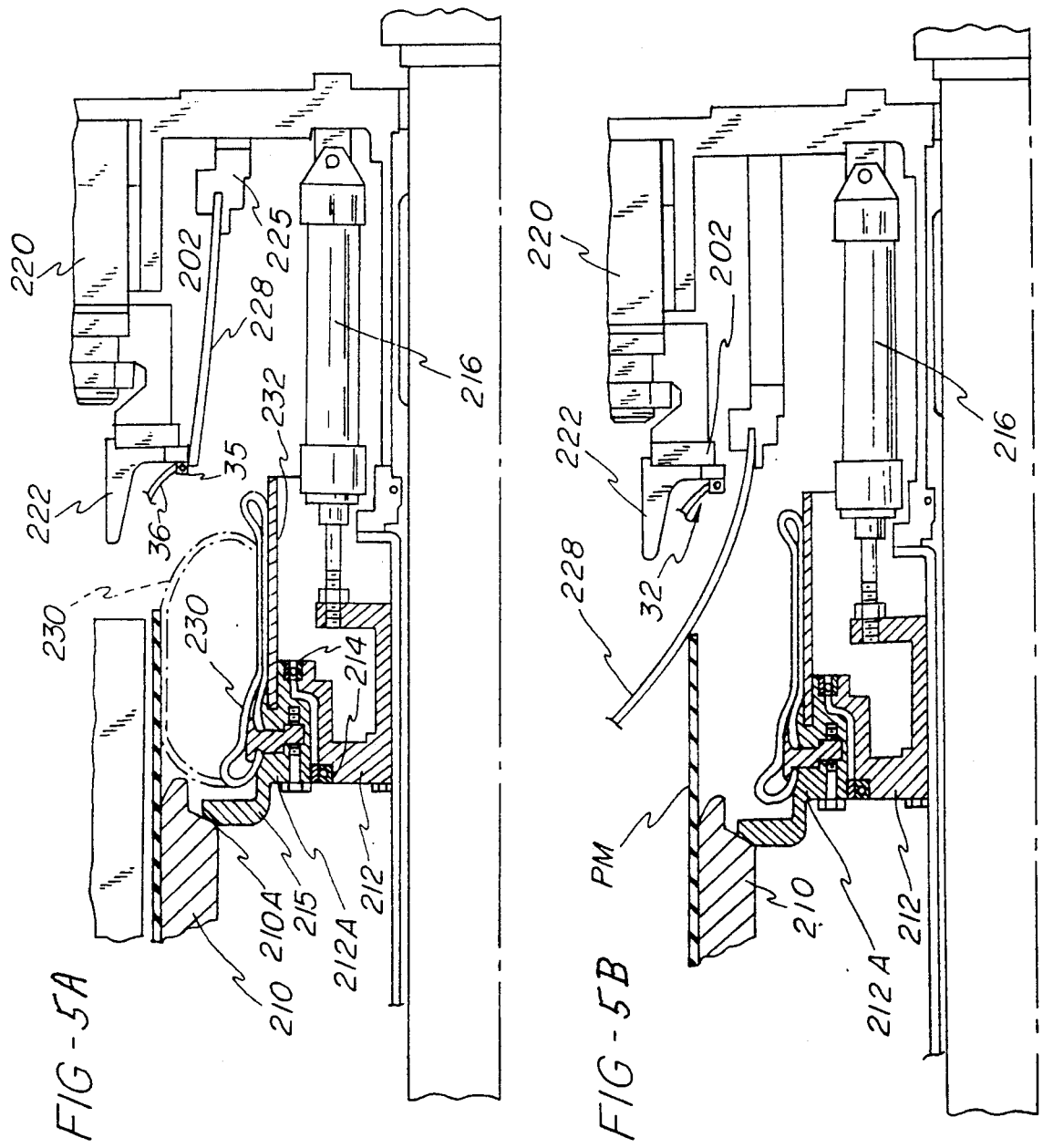

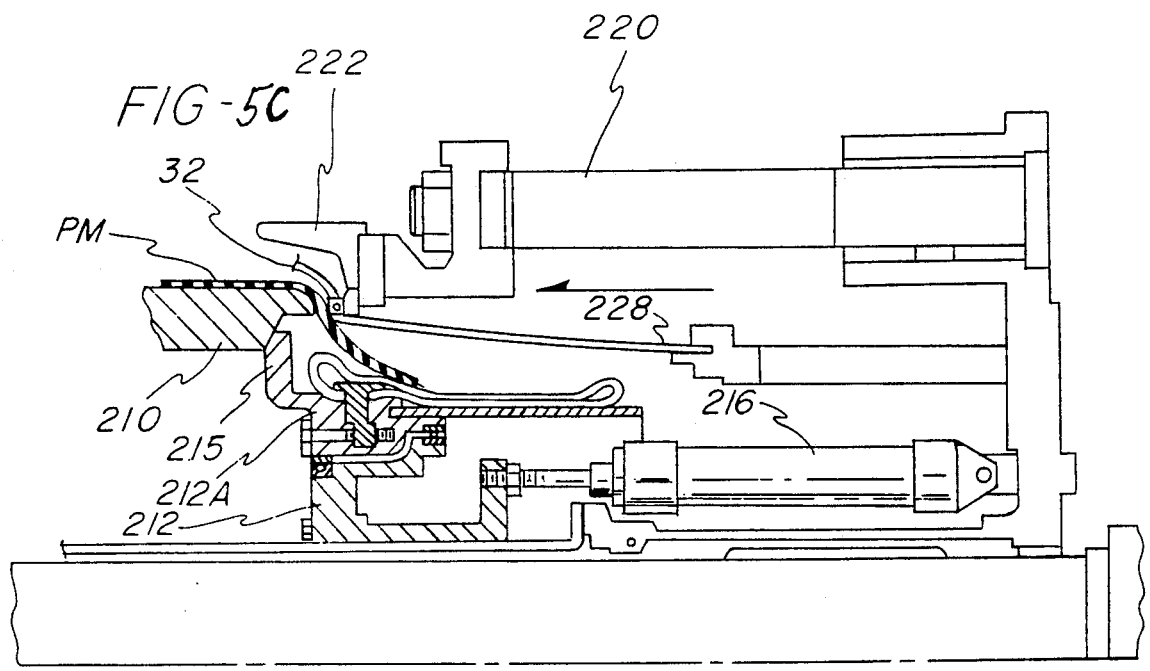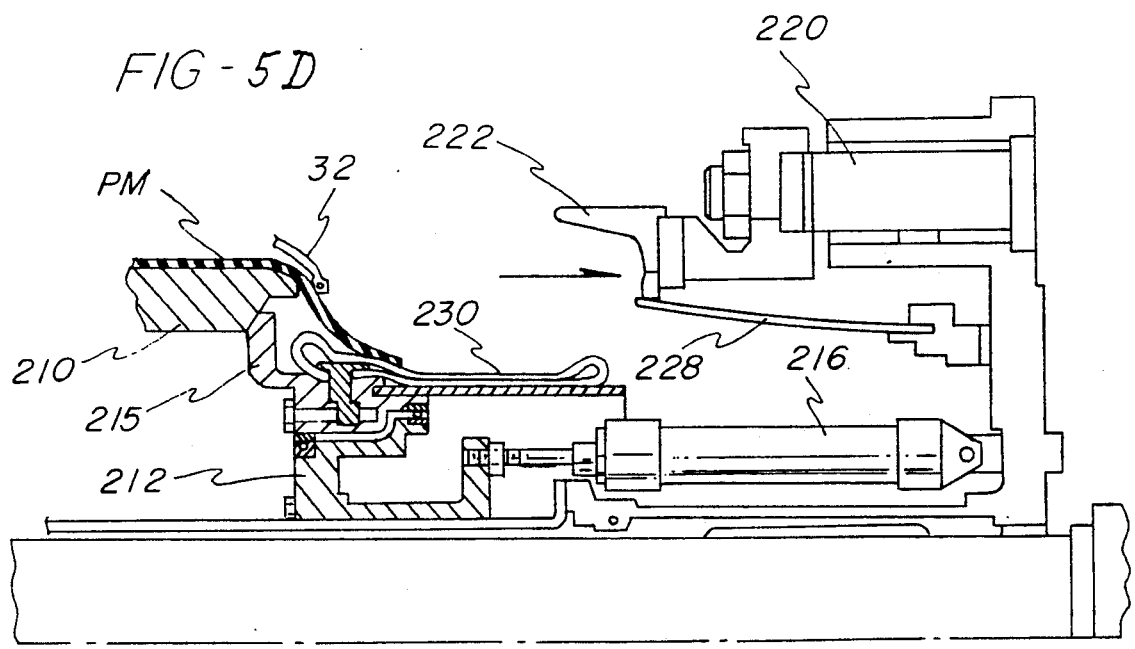

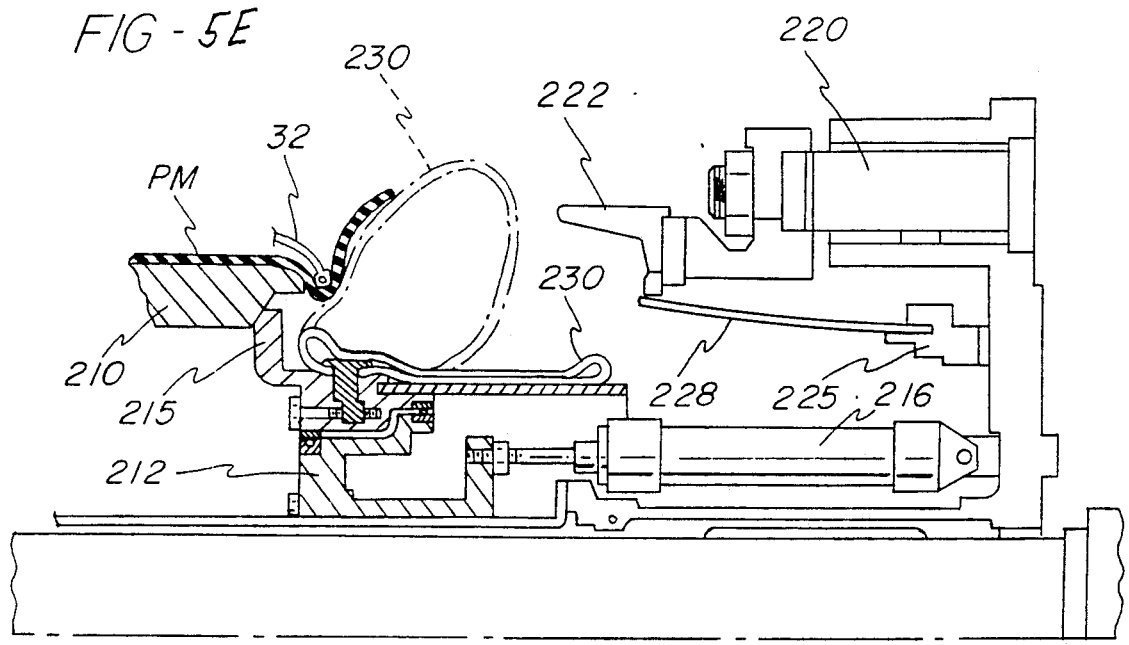
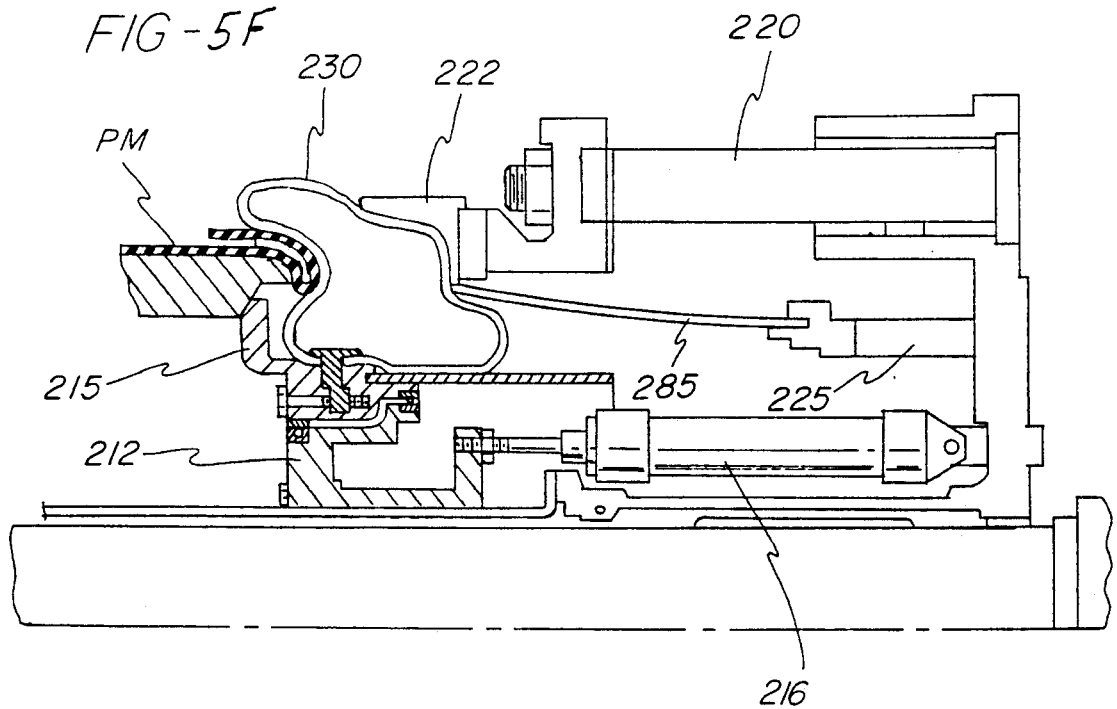

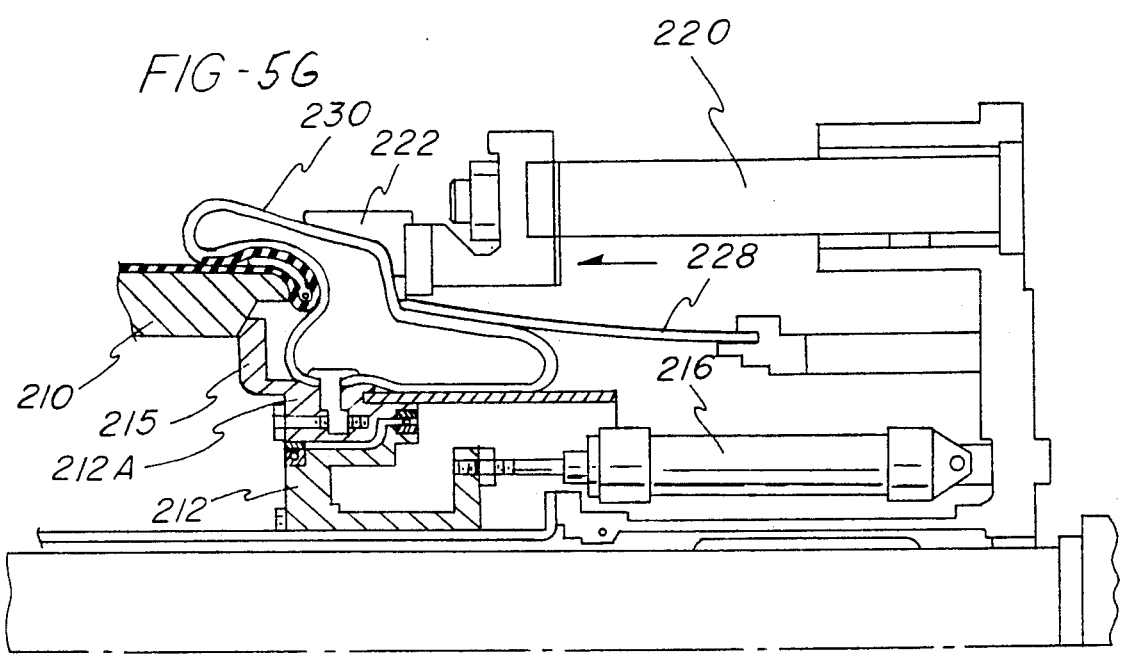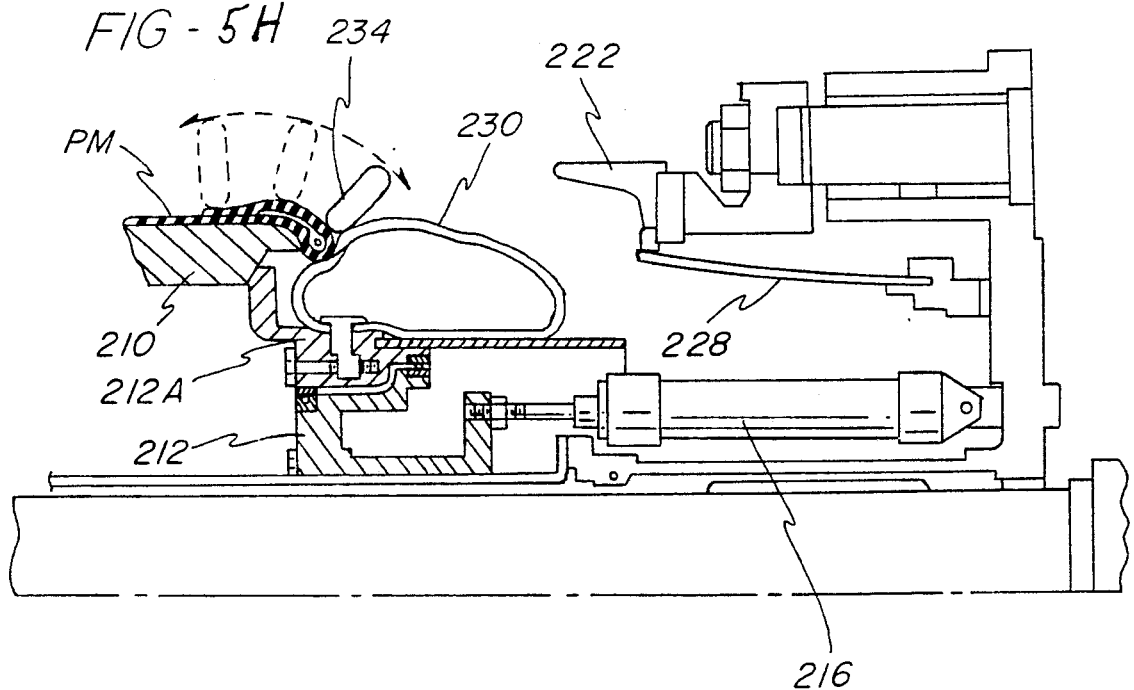

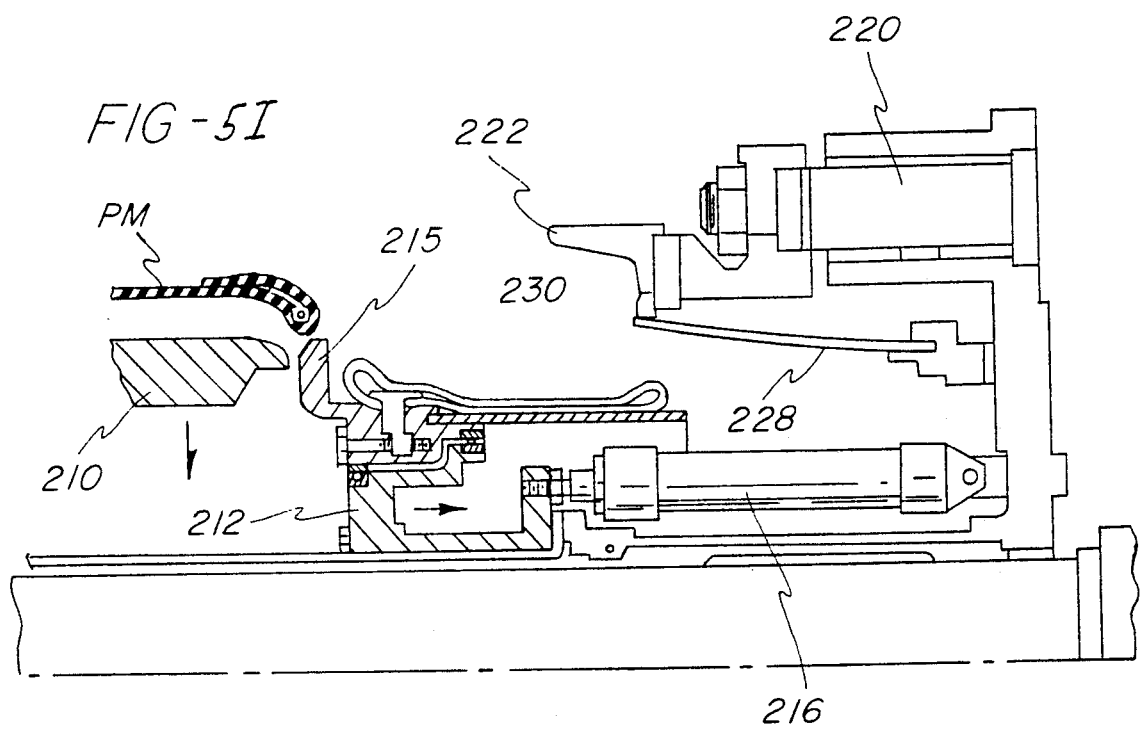

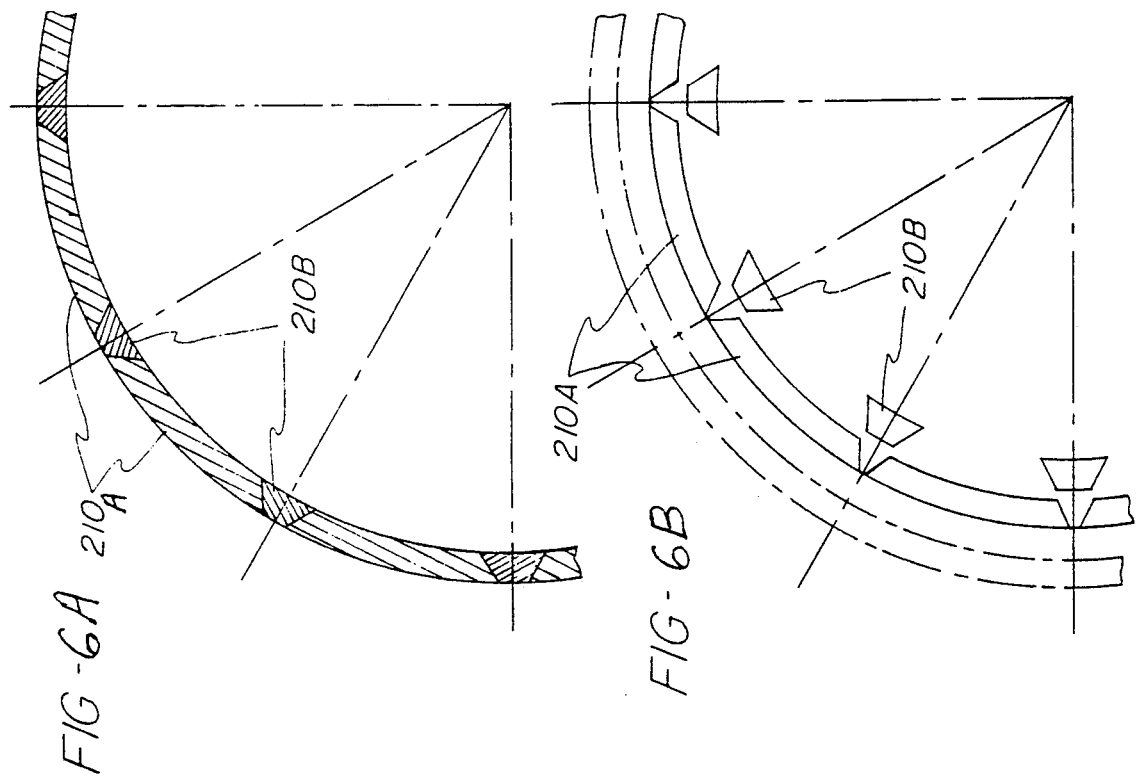

TIRE CARCASS BUILDING DRUM WITH INFLATABLE BLADDERS

BACKGROUND OF THE INVENTION

This invention relates to a system for assembly of radial tires and to methods and apparatus incorporated in such system.

The basic elements of modern radial ply pneumatic tires consist of an innerliner, one or more radial plies, sidewalls, beads and fillers, etc., all combined to form a carcass, and one or more belts made of steel cord or other cord materials combined with tread stock material to form a belt-tread stock assembly. These two assemblies are then combined to form a green tire, which is subsequently vulcanized in a mold.

U.S. Pat. No. 4,402,782 issued Sep. 6, 1983 to the assignee of this application, describes a state of the art method and apparatus for constructing such radial ply pneumatic tires by producing the two major assemblies on two distinct and separate types of apparatus, and combining those assemblies into a green tire, which is then vulcanized in a mold.

The first assembly, referred to herein as the "first stage carcass" consists of an innerliner plus one or more body plies of rubber coated cord material, a pair of axially spaced parallel bead assemblies, layers of the ply material which encompass the bead assemblies, and side wall stock material, all of which when combined comprise a first stage assembly. These tire elements are assembled and consolidated on a cylindrical carcass building drum such that the one or more body plies (in the case of a radial tire) have the body ply cords essentially parallel to the rotational axis of the building drum as the carcass is assembled thereon, e.g. extending along the cylindrical carcass. The two beads are anchored to the opposing axial extremities of the first stage carcass, for example by folding part of the plies inward around the respective beads, the beads being parallel one to the other and coaxial with the rotational axis of the carcass, and two layers of sidewall stock are circumferentially consolidated to the outer surface of the carcass, axially disposed one from the other and each adjacent to one of the beads.

Upon completion the carcass is transformed from its cylindrical shape to that of a toroid so the radial body cords, being essentially parallel to the rotational axis, are made to assume the configuration of meridians to the rotational axis of the carcass.

An integrated tire building system and apparatus is disclosed in copending U.S. patent application Ser. No. 529,080, filed of even date herewith and assigned to the assignee of this application. The disclosure of that application is incorporated herein by reference.

SUMMARY OF THE INVENTION

The present invention relates to novel features of a tire carcass building drum, and particularly to the provision of rotatably mounted turn-up bladders thereon, which bladders function to turn over extended ply ends around the bead assemblies placed on other components of a tire carcass being assembled on such drum. These bladders also provide a support for ply ends against which the consolidating and stitching rollers can act to smooth and press together the ply materials.

It is the principal object of this invention to provide a method and apparatus whereby such bladders are constructed, fitted to the carcass building drum, and used in the assembly of tire carcasses in an automated apparatus.

Other objects and advantages of the invention will be apparent from the following description, the accompanying drawings and the appended claims.

BRIEF DESCRIPTION OF THE DRAWINGS

FIGS. 3A–3G are schematic views showing the automatic placement of beads onto the bead rings of the carcass building drum;

FIGS. 5A through 5I are progressive views showing the operation of the mechanisms of the carcass building drum; and FIGS. 6A and 6B are schematic views showing the manner in which the surface of the carcass building drum retracts and expands.

BASIC TIRE CONSTRUCTION

Figure 1B:
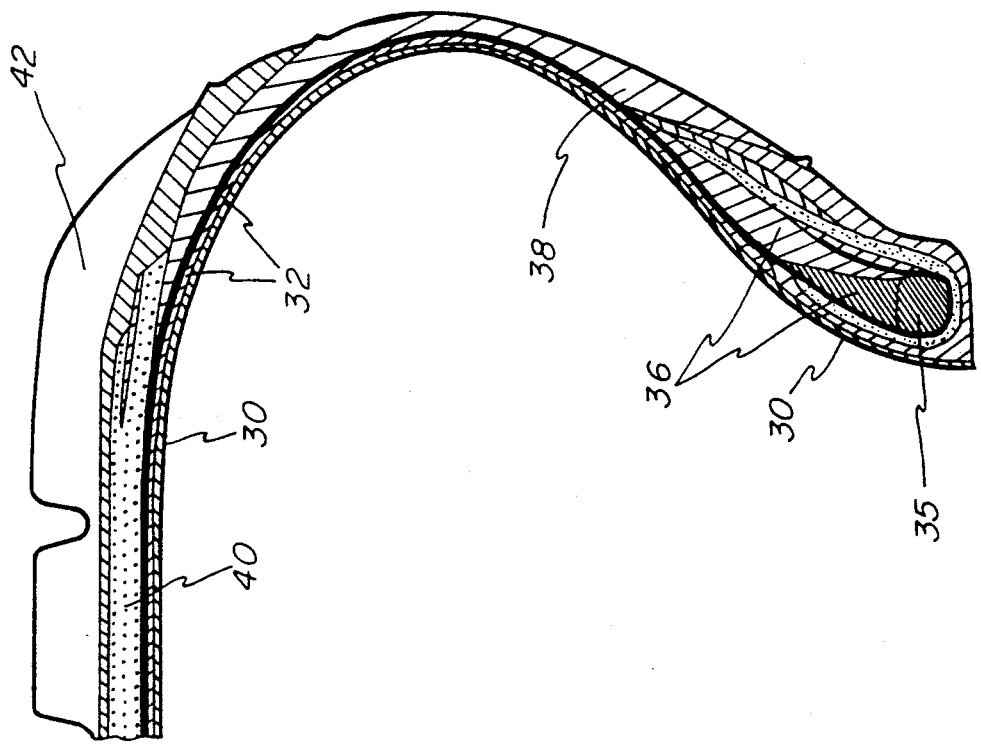
FIGS. 1A and 1B are a partial broken away perspective view and a partial cross-sectional view of a typical radial tire, illustrating the various components, their combination and locations.

FIG. IA is a broken away view of a typical tire to which the present invention is applicable. The various components are exposed in layered fashion to illustrate the relationship of the various components in the finished tire, and this also, to a substantial extent, shows the manner in which the tire is built from the inside out. FIG. 1B is an enlarged half cross-section through such a tire. Thus the interior component, which provides the inner surface of the tire to hold pneumatic pressure, is formed by the innerliner 30 upon which are placed one or more plies 32, which in component form may be made of textile or steel cords 33 which are radially imbedded in two layers of uncured rubber. In the region which engages a wheel rim of a vehicle, there is a circular bead 35 to which is attached one or more filler pieces 36, and sidewalls 38. These components, when assembled, make up essentially the first stage carcass, to which reference is later made in this description.

Figure 1A:
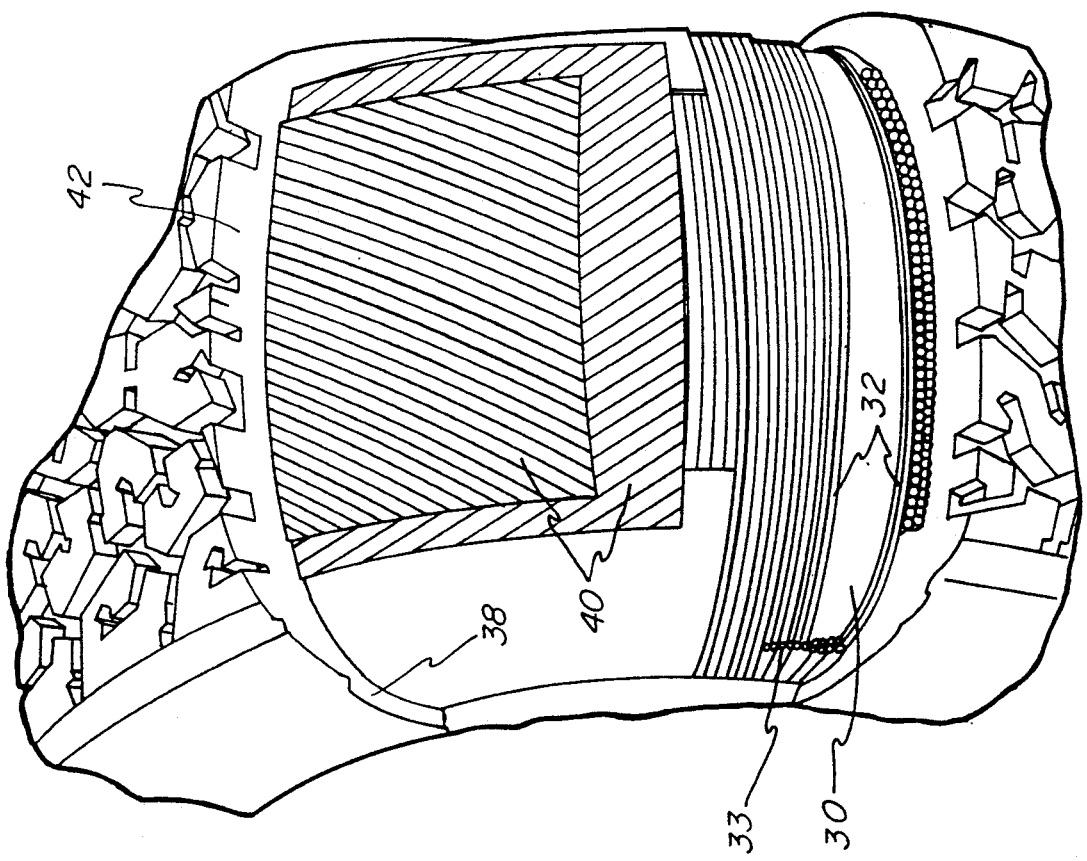

Peripherally outward, the plies are surrounded by one or more belts 40, which incorporate either steel or other textile-like cord materials. Finally, the tread stock, indicated generally at 42, is the outermost component. The belts and tread stock material are joined to make up a belt-tread stock assembly which is in turn attached to the carcass after it has been shaped generally into a toroid to form a green tire GT, which is the end product provided by the system of this invention. The green tire is later vulcanized in a mold, which in the presence of heat and internal pressure cures the rubber components and determines the final appearance of the completed tire, with a tread formation as illustrated typically in FIG. 1A.

General Layout

Figure 2:
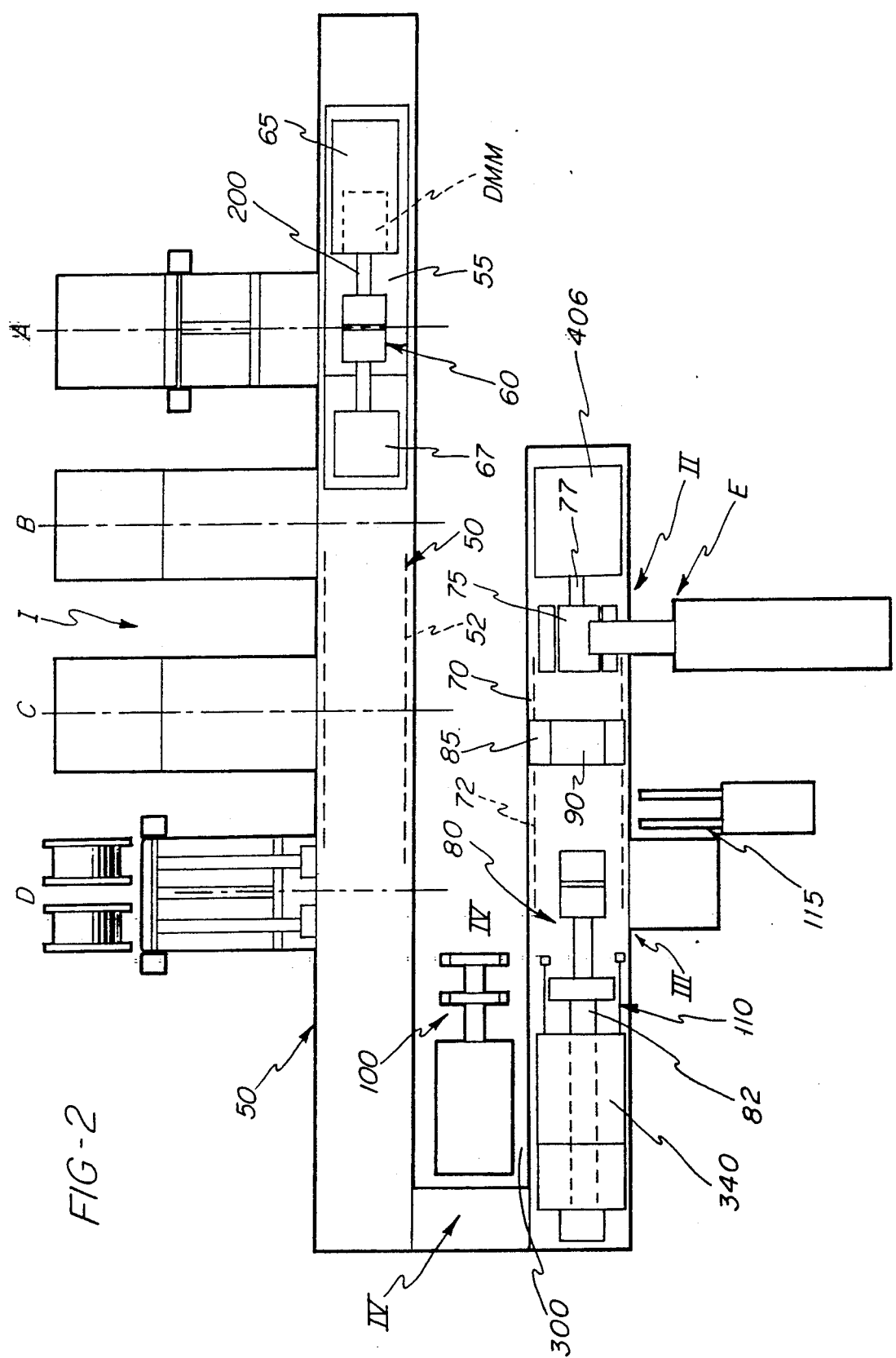
FIG. 2 is a schematic plan view of the system.

FIG. 2 is a floor plan of the system which includes on one side a novel carcass building section I, on the other side a belt and treadstock building section II together with the green tire building section III, and between sections I and III a carcass carrying and transfer section IV, which unloads a completed carcass TC from section I and places it in the tire building section III. The carcass building section I includes a bed 50 having a track or way 52 for a carriage 55 that supports a carcass building drum 60 and its associated headstock 65 and tailstock 67, along with bead ring placers 70 (FIG. 3) for this building drum 60. Track 52 defines a carcass building path and along the track is a plurality of stations A, B, C, and D which function as innerliner, ply and sidewall servers. It should be understood that additional ply servers may be added, as between stations C and D.

In operation, carriage 55 is moved under program control into alignment with the center of ply material or sidewall material at the various stations. Circular beads or hoops 35, combined with a filler 36, are set on bead placers 70 which are associated with drum 60, and predetermined lengths of ply materials are likewise placed on and assembled around the drum, all in a desired sequence, and the edges of at least some plies are turned over the beads, producing a completed tire carcass TC, hereinafter referred to as the first stage carcass assembly, and as shown in FIGS. 5A-5I.

Sections II and III preferably are supported on a common second bed 70 having another track or way 72 extending in spaced relation to the first track 52, preferably parallel thereto. At one end of the second track 72 there is a belt/tread stock building drum 75 (sometimes called a belt building drum), supported on a rotatable shaft 77 with its axis of rotation extending parallel to second track 72. Adjacent the belt building drum there is a belt server E which can supply one or more belt components to the belt building drum 75, and a tread stock server F (below server E) which can supply a length of tread stock to the belt building drum. At the other end of second track 72 there is a tire building or assembly drum 80, comprising two drum halves rotatably supported on a second shaft 82 with its axis parallel to track 72 and precisely in line with the axis of belt building drum 75. A carriage 85 is supported for movement between the drums 75 and 80 along track 72, and on carriage 85 is a transfer ring 90 which can engage and remove a completed belt/tread stock assembly BTS from belt building drum 75 and move such assembly over and around a carcass which has been placed on tire building drum 80, to be manipulated into a toroidal shape.

Between the two tracks 52 and 72, the transfer section IV includes a carcass transfer robot 100 which functions to remove a first stage tire carcass TC from carcass building drum 60 and position carcass TC onto the tire building drum 80, where the carcass is transformed into the desired toroidal shape, as part of the application of a belt/tread stock assembly to that carcass. The two assemblies are then stitched together to produce a green tire GT. Once the green tire is completed, an unloading mechanism 110 associated with the tire building drum engages the tire, then moves the tire to a discharge chute assembly 115 and releases the tire, from whence the tire is taken to a vulcanizing press for final curing.

Carcass Building Drum

The carcass building drum 60 is rotatably mounted on the carriage headstock 65 by a suitable rotatably driven shaft 200 (FIGS. 1 and 3), and one of the features of the invention is the arrangement whereby the bead rings are loaded into the placers 70, transferred onto holder rings 202 at opposite ends of drum 60, and the carriage 55 then is moved to align the drum's transverse center plane with the various ply material lengths PM at the servers. Then the innerliner 30 and plies 32 are progressively taken from servers A, B and C, as are side wall stock pieces 38 from server D, and caused to wrap around the carcass building drum 60. To accomplish this, the drum is circumferentially collapsible and has a programmably controlled drive DMM which starts, stops, and rotates shaft 200 as required to perform these successive building steps. The drum also incorporates an inflatable bladder mechanism which at the appropriate time will fold the ends of certain plies over and around the bead and fillers. Bladder turn-up devices are generally known, however the bladder turn-up mechanism provided with this invention embodies a number of novel features. The bladder assemblies (see FIGS. 5A-5I and later description) are rotatably mounted on their corresponding support hardware, which are adapted to be engaged to and driven by the building drum 60 when that drum is being rotated.

As a further feature of this arrangement, bladders are designed and their internal pressure regulation are very precisely controlled so that same may be only partially inflated to a desired diameter and specific shape so that they would act as drum extensions whereby they are capable of supporting ply materials that are wider than the building drum and which, in that service mode will also act as an anvil that will absorb the pressure of the ply stitch roller which is applied against drum 60 to drive out unwanted trapped air and which also stitches together the leading and trailing ply endings. These features make automated carcass assembly possible.

Figure 4:
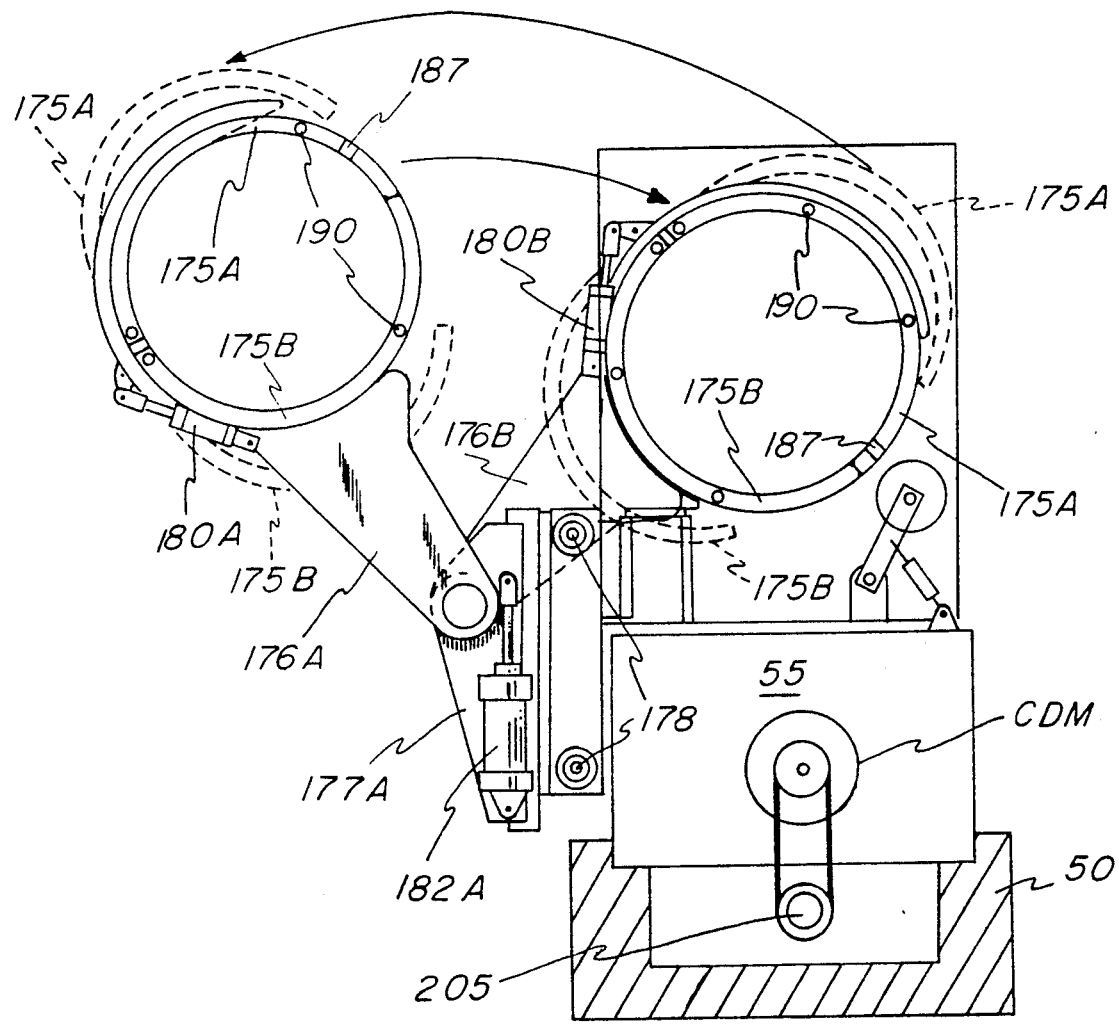
FIG. 4 is a view showing details of, and relative positions of, one of the bead ring placer devices.

Mounted on carriage 55, by a pair of spaced apart swinging arms 193, is a stitching or smoothing roller 195, preferably rubber covered, which can be moved into and out of contact with the plies and other material added to drum 60, under the control of remotely automatically operated pneumatic cylinders 196 (see FIG. 4). At appropriate times during carcass construction, even while the carriage is moving between stations, drum 60 may be rotated and roller 195 actuated to press the sticky plies of uncured rubber material together and eliminate any air pockets or irregularities which may occur as the plies are "built up" on drum 60.

Carriage 55 carries its drive CDM which in an actual embodiment comprises a digitally driven motor connected to a rotating ball mechanism on a ball screw 205 which runs the length of the bed 50 (see FIG. 4). Thus actuation of the drive causes the carriage to travel along the ball screw 205 and bed 50. The carriage also includes a separable section 55A which carries tailstock 67, and which is normally connected to and travels with the main carriage 55, connected thereto by solenoid actuated shot-pins. When it is necessary to separate drum 60 from the tailstock, to unload a completed carcass, these shot-pins are retracted and the carriage is driven in reverse direction, moving away from the now disconnected section 55A by the length of a pair of trailing arms 208 which are attached to carriage section 55A and to air cylinders 209 on the main carriage 55. This provides a sliding "lost motion" type of connection between the carriage sections 55 and 55A, yet provides for returning the section 55A into engagement with the main carriage 55, and re-insertion of the shot pins. The space thus created between drum 60 and tailstock 67 allows unloading movement of a completed carcass.

At the time of such a separation, the carriage is located adjacent server D, as is later described, since a carcass has been completed on drum 60. The placers 70 are swung to the side of carriage 55, with segments 175A and 175B closed together. There, the operator places a bead and filler assembly 32, 36 on each placer, and the sequence illustrated in FIGS. 3A through 3G is initiated. Placers 70 are moved adjacent each other and align with the gap between drum 60 and tailstock 67, as in FIG. 3B. Next, the placers are swung inward of the carriage, to become coaxial with the drum centerline, then the placers are moved to the bead holders 202 (see FIG. 5A etc.). This sequence is shown diagrammatically in FIGS. 3C and 3D, and also in the mechanism motion indicated in FIG. 4.

Figure 3E:
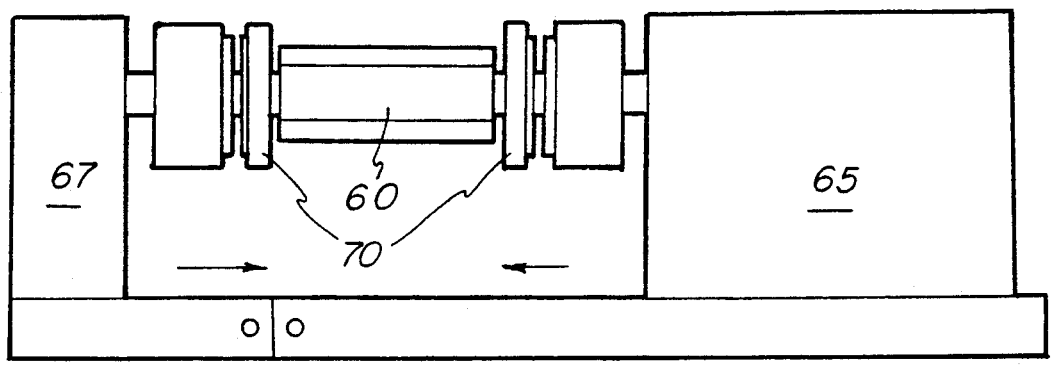
Figure 3F:
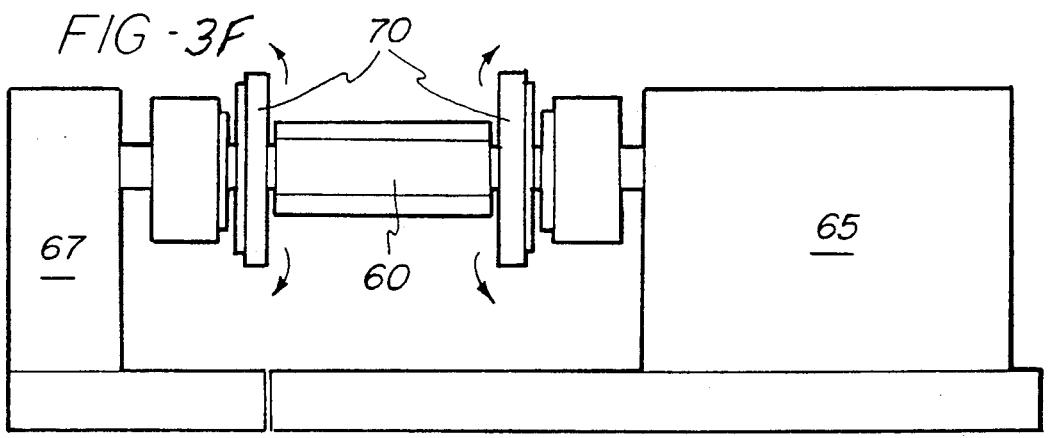
Figure 3G:
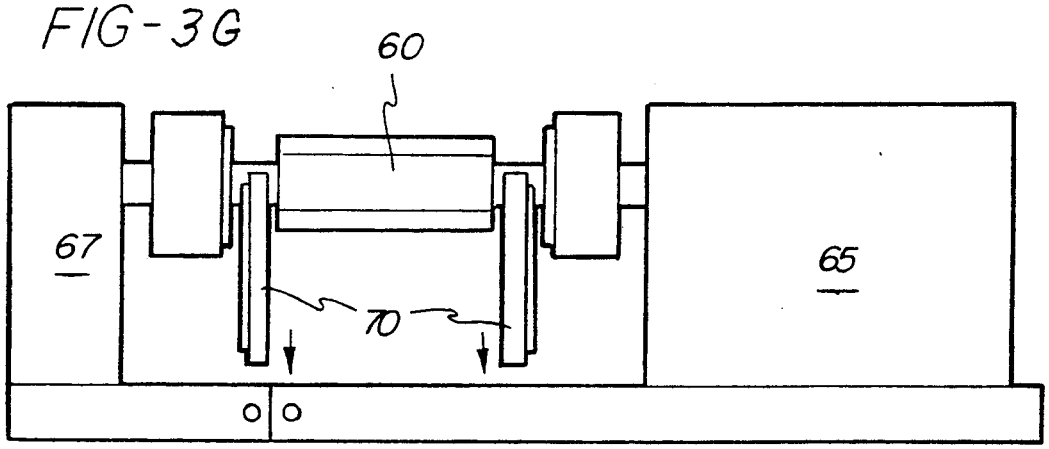

During this action, the carriage 55 is moving to the other end of bed 50, adjacent server A. When the carriage reaches that location, the drive CDM is reversed, the main carriage overtakes the now stationary section 55A, and the shot-pins 205 are actuated to rejoin the carriage section 55A to the main carriage 55, as arms 207 are free to move on section 55A for a predetermined distance before engaging and pushing against it. This is indicated in FIG. 3D, wherein the placers 70 are now moved to the bead ring assembly holders 202, and the bead ring assemblies are transferred. Next, after successful transfer is indicated, the placers 70 move toward each other (FIG. 3E) and the segments 175A and 175B are opened (FIG. 3F), then the segments are swung out around drum 60 (FIGS. 3G and 4). Therefore, when the carriage is ready to commence its movements to the various servers, the bead assemblies 32, 36 are in position on the holders 202.

FIGS. 6A and 6B show schematically the arrangement of drum segments 210A and 210B which make up the exterior of drum 60. The construction of such building drums is known per se, thus it will suffice to note that the segments 210A and 210B are movable between an expanded or operating position, shown in FIG. 6A, where their outer surfaces coincide to define a cylindrical continuity, and a retracted position as in FIG. 6B where the segments retract inwardly, first segments 210B, followed by segments 210A. This occurs after a carcass has been completed on drum 60 and the carcass is ready to be unloaded.

The mechanism for accomplishing this collapse of drum 60 is shown in FIGS. 5A-5I, with the segments expanded to operating position in FIGS. 5A through 5H, and in retracted position in FIG. 5I. This mechanism, which has additional functions, includes an annular control shoe 212 having a toe surface 215 which engages under a beveled underside 210A at each end of the drum. It will be understood that the mechanism shown is essentially duplicated at each end of drum 60. The shoe 212 is moved axially of drum 60 by a plurality of pneumatic cylinders 216, one of which is shown in the various views of FIG. 15. On shoe 212 there is a secondary shoe piece 212A that is in turn supported by bearings 214 to surround and be movable relative to, the main shoe 212. The toe surface 215 is actually a part of the secondary shoe piece 212A.

The bead holder 202 is supported on an axially extensible arm 220 which also carries a bladder guide shoe 222, located radially outward of the bead holder. Arm 220 when fully extended (FIG. 5C), places the bead assembly 32, 36 at the end of ply material PM on the drum surface. When partially extended later in the sequence (FIGS. 5E and 5F) the guide shoe 222 performs part of a ply end folding function. Radially inward of arm 220 is a secondary arm 225, carrying a plurality of flexible blades 228 thereon, which can be thrust axially of drum 60 to interact with ends of ply material, as in FIGS. 5B and 5C. It should be understood that there are pneumatic actuators (not shown) for arms 220 and 225, however these have not been illustrated since their details are not important to an understanding of the mechanism. Similarly, for simplicity of illustration, only one piece of ply material PM is shown in these drawings, but in fact there may be two or more, one laid over the other, and an additional ply may be added after the steps shown in FIGS. 5B–5H.

As a further feature of this arrangement, bladders 230 are designed, and their internal pressure regulation precisely controlled, such that the bladders may be only partially inflated to a desired diameter and specific shape, so the bladders will act as drum extensions, whereby they are capable of supporting ply materials which are wider than the building drum surface and which, in that service mode, will also act as an anvil that will absorb the pressure of the ply stitcher roller applied against plies assembled on the drum surface, to expel unwanted trapped air and also to stitch together the leading and trailing ply endings.

A flexible bladder 230 is clamped to the secondary toe piece 212A, and in its retracted location the major part of this bladder rests on a support cylinder 232 which is mounted to the secondary shoe piece 212A. Bladder 230 can be inflated and deflated through air passages and solenoid controlled valves which are not shown. Suffice to say that the bladder can be inflated at appropriate times, and deflated likewise. After an innerliner and one or more plies are placed on drum 60, and while drum 60 is being rotated, secondary arm 225 extends axially inward of the drum, and the blades 228 engage over the ends of the ply material PM, as shown in FIG. 5B, pushing inward to move the ply material inward, as shown in FIG. 5C. Primary arm 220 then moves axially inward, moving the bead ring/filler assembly 32 onto the sticky outer surface of the ply material PM, and both arms retract axially outward, to positions shown in FIG. 5D.

Next, bladder 230 is inflated (FIG. 5E, full line and phantom lines), and begins to fold ply material PM around the bead ring and filler assembly. Then, arm 220 again moves axially inward, shoe 222 engages bladder 230, and this causes the bladder to expand over and around the bead ring, carrying and folding the ply material PM around until the bead and filler assembly are fully enclosed (FIG. 5G). Since the foregoing bead assembly placement and ply end folding can be accomplished by mechanisms carried on the carriage and associated with the carcass building drum, it is possible to at least partially perform these functions while the carriage is traveling between ply server stations, for example prior to the last ply application.

The carriage then can proceed to the next server, to apply another piece of ply material around the partial carcass assembly on the drum, followed by application of the side wall segments 38 by the sidewall server D.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. In a tire carcass building machine having
   a carcass building drum,
   a carriage supporting said carcass building drum for rotation about its central axis, drive means on said carriage for selectively rotating said carcass building drum, a plurality of carcass component servers arranged to supply lengths of ply material of predetermined length to said drum in serial fashion, one upon the other, a building surface on said drum including movable segments adapted to move radially inward upon completion of building a carcass to allow removal of the finished carcass, means for setting bead assemblies on the assembled ply materials at the ends of said building surface, and annular inflatable bladder members extending adjacent the ends of said drum; the improvement comprising means movable axially of said drum toward and away from the ends of said building surface comprising a main shoe and a secondary shoe rotatably mounted by bearing means on said main shoe, said secondary shoe supporting said bladder means and including a toe surface engageable with the segments at the ends of said drum, allowing said bladers to rotate with said building surface, and means for selectively inflating said bladders including to form a support for the ends of ply material extending beyond the ends of said building surface.

2. Apparatus as defined in claim 1, further comprising guiding means including retractable holddown blades for pushing extended ends of ply material in a generally radially inward direction to assure bead assembly placement outward of the ply material with said bladders deflated and radially inward of the extended ends of ply material, said inflating means further capable of inflating said bladders to move the extended ends of ply material outward of said building surface and around the bead assemblies, annular guide shoe means for pushing against said bladders as the same are inflated to fold the extended ends of said ply material around the bead assemblies.

3. Apparatus as defined in claim 1, further comprising said means for setting bead assemblies including annular holders at opposite ends of said drum and means for moving said holders toward and away from the ends of said building surface, said annular holders also supporting said annular guide shoes.

* * * * *